Oct. 18, 1949.　　　　　A. G. ROSE　　　　　2,485,215
TROLLEY CONVEYER BRACKET

Filed May 7, 1945　　　　　　　　　　　　　　2 Sheets-Sheet 1

Inventor
Andrew G. Rose
By Joseph Farley
Attorney

Oct. 18, 1949. A. G. ROSE 2,485,215
TROLLEY CONVEYER BRACKET
Filed May 7, 1945 2 Sheets-Sheet 2

Inventor
Andrew G. Rose
By Joseph Varley
Attorney

Patented Oct. 18, 1949

2,485,215

UNITED STATES PATENT OFFICE 2,485,215

TROLLEY CONVEYER BRACKET

Andrew G. Rose, Detroit, Mich., assignor to Jervis B. Webb Company, Detroit, Mich., a corporation of Michigan Application May 7, 1945, Serial No. 592,430

10 Claims. (Cl. 105—155)

1

The present invention pertains to a novel trolley bracket assembly for a conveyor or the like and to the manner of making the assembly. The assembly of the present invention incorporates a trolley wheel at each side of the bracket and a dog pivotally carried by the bracket for engagement by a pusher carried by a traveling chain. The pusher rides over the dog in one direction and abuts it in the opposite direction to propel the trolley assembly in that direction. The bracket of the assembly is designated to carry a load.

The assembly of the trolley wheels and dog into the trolley bracket ordinarily involves costly machining operations on the bracket as well as considerable manipulation of the parts. In many instances it is also desirable that the trolley bracket carry a guide roller for engaging the trolley rails on side sway of the assembly in order to avoid binding and scraping. Where such a guide roller is provided, it is evident that the fabrication and assembly of the device is still further complicated.

The principal object of this invention is to simplify the fabrication of the bracket and to reduce the time and the number of manipulations in assembling the various parts with the bracket. In the accomplishment of this object, I form the bracket of two like plates designed to be secured together in face-to-face and coinciding relation. The plates, however, are not secured together until the various parts are assembled therewith.

Each plate is formed in its inner surface with appropriate recesses which, when matched or aligned, accommodate the journals of the dog and the guide roller. In addition, each plate has a transverse opening therethrough for receiving the pin or axle of a trolley wheel.

In the assembly operation, each trolley wheel pin is mounted in its respective plate before the plates are fastened together. The journals of the dog and the guide roller are seated halfway in the corresponding recesses of one of the plates. The other plate is then matched to the first plate in face-to-face and coinciding relation so that the recesses in the second plate receive the remaining half of the dog journal and the guide roller journal. The plates are then secured together preferably by means of a suitable number of bolts. The trolley wheels may be mounted on their pins either before or after the plates are secured together.

The above and other objects of the invention will appear more fully from the following more

2 detailed description and by reference to the accompanying drawings forming a part hereof and wherein:

Reference to these views will now be made by use of like characters which are employed to designate corresponding parts throughout.

Figure 1:
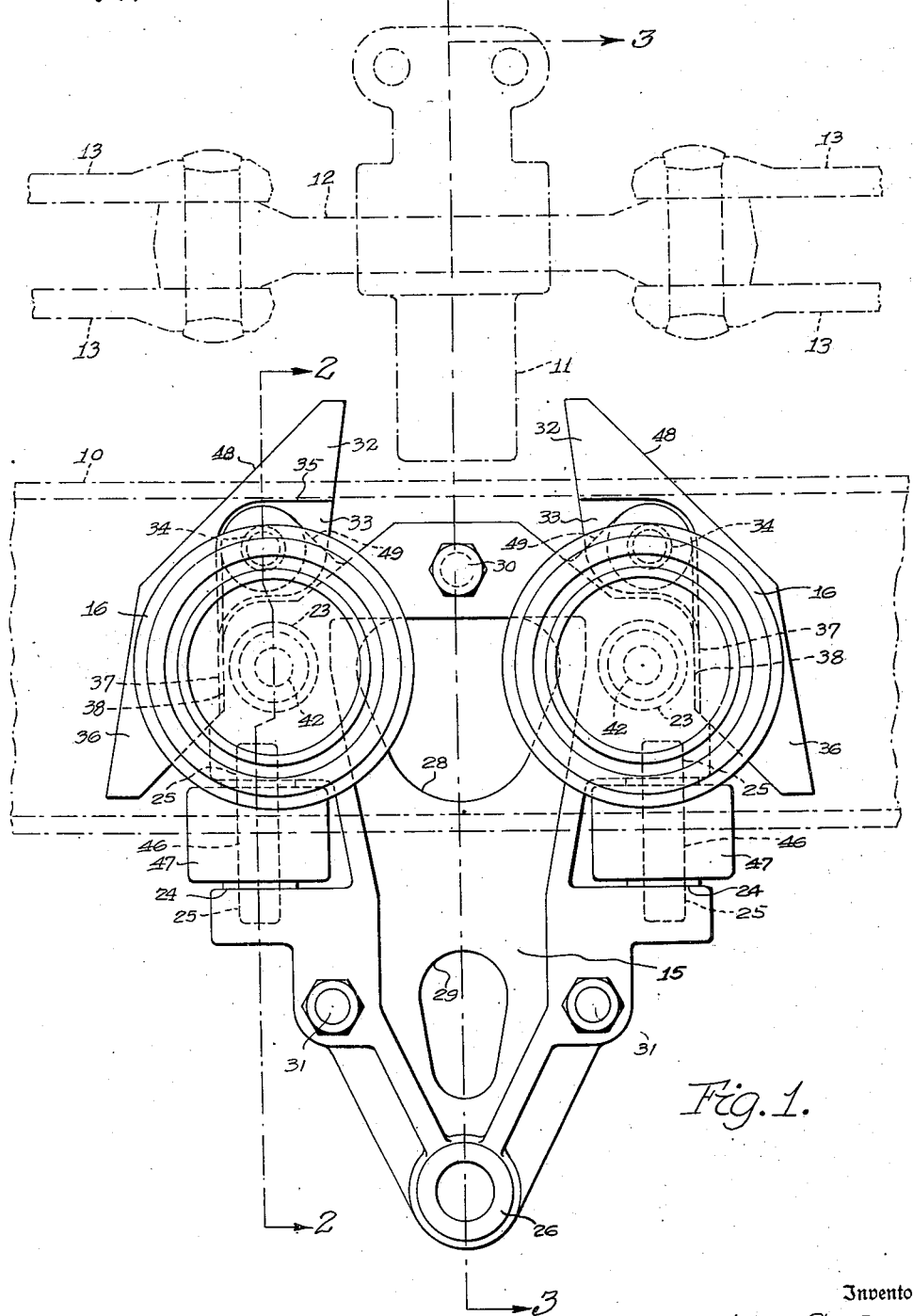
Fig. 1 is a side elevation of the device, also showing the pusher chain and the track in outline.
Figures 2, 3, 4:
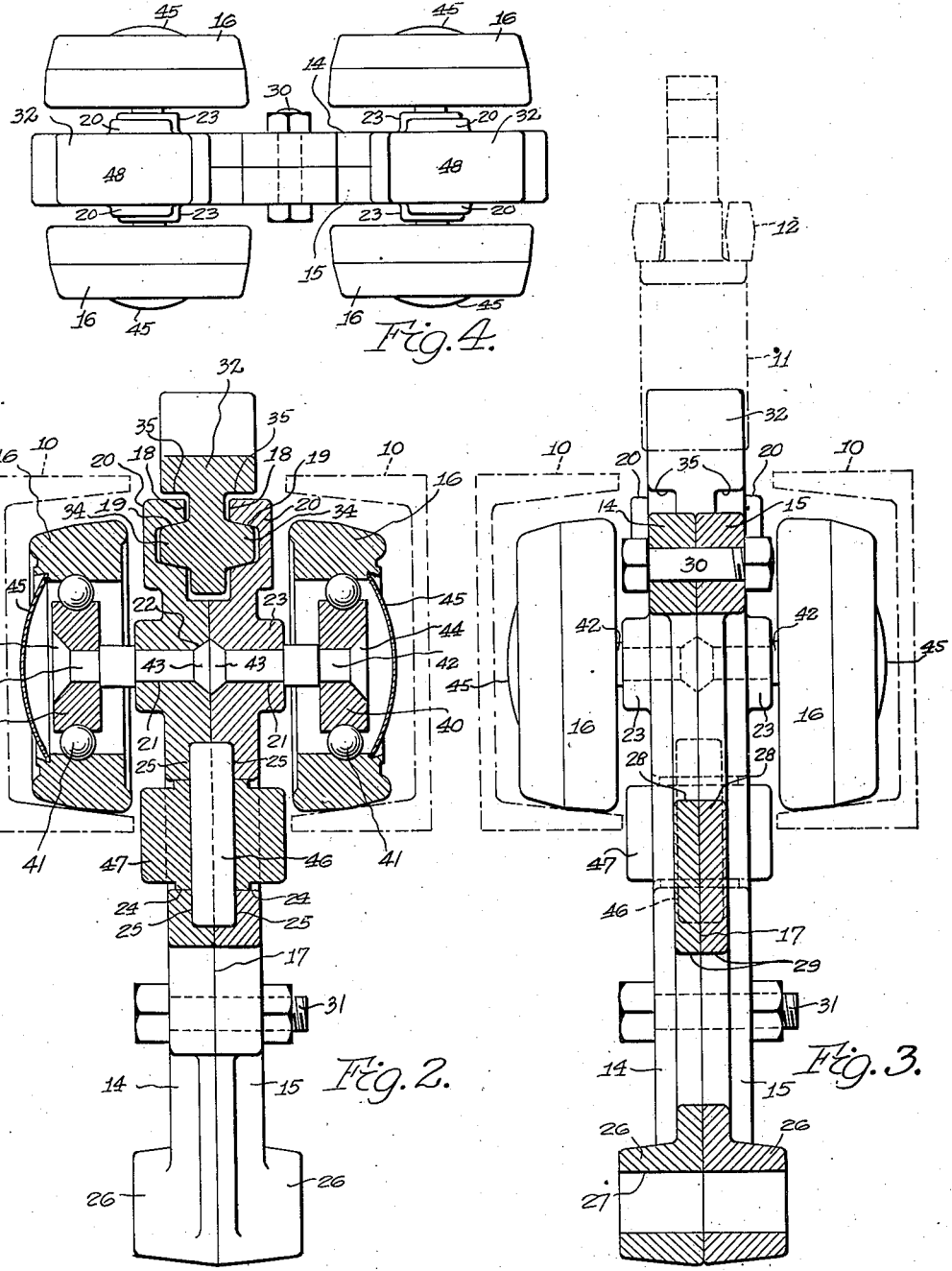
Fig. 2 is a section on the line 2—2 of Fig. 1.
Fig. 3 is a section on the line 3—3 of Fig. 1.
Fig. 4 is a plan view of the device.

In Figs. 1, 2 and 3 is shown in outline a track consisting of a pair of channels 10 turned over on a side so that they face each other. A roller assembly rides in these channels or rails and is propelled in either direction by a pusher 11 carried by a chain of the Weston or rivetless type. Such a chain, as known in the art, consists of spaced center links 12 joined by pairs of side bars 13 superimposed with respect to one another.

The roller or trolley assembly includes a pair of like body or bracket members 14, 15 placed in mating or coinciding relation to each other and positioned between the rails 10. This structure carries two pairs of coaxial rollers 16, one member of each pair being disposed at each side of the assembled parts 14, 15 to ride in the adjacent rail 10, as shown more clearly in Figs. 2 and 3.

Each of the members 14, 15 may be regarded as having an initially plane face 17 which becomes the inner face, inasmuch as the members are assembled face to face, as shown in Figs. 2 and 3. Each face 17 is formed with several recesses and cavities, and it will be understood that corresponding recesses and cavities in the two members 14, 15 face one another in horizontal alignment. A description of only one of the parts 14, 15 need be given, inasmuch as both are alike. Moreover, two sets of recesses and cavities are provided in each face 17 to correspond respectively with the pairs of rollers 16. These sets also are identical and only one set will be described.

From the upper end of each member 14, 15 a notch 18 is formed in the face 17 to extend somewhat more than half way to the common axis of a pair of rollers 16. In the vertical wall of the notch is formed a frusto-conical recess 19 on an axis perpendicular to the plane of the face 17. Around these recesses the material may be thickened outwardly as indicated by the numeral 20, in the form of bosses.

Beneath the notch 18, each member 14, 15, is formed with a cylindrical opening 21 coaxial with the rollers 16 and extending through the outer surface of the member. The outer end of the opening, at the face 17, is flared at 22 for a purpose that will presently be described. Around the opening 21, the material may also be thickened at 23 on the outer surface.

At some distance below the opening 21, each member 14, 15 is formed with another and larger cylindrical opening 24 on an axis parallel to the faces 17. This opening is traversed by a semi-cylindrical recess 25 having its axis in the corresponding face 17.

The lower end of each member is again thickened outwardly at 26 to form a bearing having a cylindrical recess 27 on an axis perpendicular to the face 17.

The members 14, 15 may be cored out at 28 between their spaced openings 21 and again at 29 above the lower end for lightness and economy of metal, as shown in Fig. 1.

After assembly of other parts with the members 14, 15 as will presently be shown, these members are fastened together by a bolt 30 above the opening 28 and a pair of bolts 31 at opposite sides of the opening 29.

The brackets 14, 15 carry a dog 32 at each end or over the axis of each pair of rollers 16. Where the dog is to be pivotally mounted, near its upper end, it is reduced in thickness at 33 in order to lie loosely in the combined notches 18. On this reduced portion is formed a journal consisting of a frusto-conical piece 34 at each side of the portion 33 and extending into the corresponding recess 19.

The upper boundary of the said portion or web 33 is a horizontal line 35 (Fig. 1) disposed slightly above the adjacent upper edge of the members 14, 15 and extending to the inner edge of the dog. This formation permits a substantial inward tilting of the dog on its axle 34, 34 under conditions that will presently be pointed out. From its pivotal axis the dog is continued in the form of a depending portion 36 having an inner vertical face 37 which, when there is no pressure on the dog, lies close to a vertical face 38 formed on the adjacent end of the brackets 14, 15. Each roller assembly comprises, within the roller 16, a bearing race 40 and a series of rotating bearing members 41 between the race and the roller. The race is carried on a pin or wheel rivet 42 extending, when finished, to the contiguous faces 17 of the members 14, 15.

In assembling the trolley, the pin 42 of each roller assembly is inserted in the corresponding member 14, 15 and its inner end is riveted at 43 to fill the recess 42. The outer end of the pin may be previously riveted at 44 against the race 40 and covered by a shield 45 fitted in the roller 16. A cylindrical pin 46 carrying a guide roller 47 is laid in one of the semi-cylindrical recesses 25 in such manner that the roller extends to one of the openings 24 and has its ends bearing on the upper and lower ends of said recess. One end of the pusher axle 34 is inserted in the recess 19 of the bracket member that now carries the pin 46 and the roller 47. The remaining bracket member, with the wheel pin 42 riveted therein as described, is now matched to the first member to receive the remaining half of the axle 34 and of the pin 46 and roller 47. The members 14, 15 are finally secured together by the bolts 30, 31.

In the operation of the device, assuming that the pusher 11 has not yet entered between the dogs 32, it approaches one dog or the other and first engages the sloped upper edge 48 of the dog. The upper edge portion 49 of the bracket directly beneath the line 35 is spaced considerably from that line, as shown in Fig. 1. Consequently, the dog is capable of an unresisted inward pivotal movement on being engaged by the pusher 11 while riding on the surface 48. This pivotal movement is sufficient to permit the pusher to ride over the extreme upper end of the dog and into the space between the two dogs. The depending portion 36 of the dog has sufficient weight to restore the dog to its initial position, as shown in Fig. 1, as soon as it is disengaged by the pusher 11.

As the pusher continues its travel it obviously engages the inner face of the next dog and tends to swing the dog outwardly at its upper end. The depending portion 36 is thereby moved a short distance until its vertical face 37 engages the adjacent vertical face 38 on the bracket, whereupon the dog becomes a fixed abutment engaged by the pusher 11 for travel of the entire trolley assembly.

The rollers 46 lie between the lower edges of the rail 10 and prevent binding of the trolley by engaging these edges during side sway of the trolley. The load is obviously suspended from the bearing 26.

While I have shown a satisfactory constructional example of the present invention, it will be understood that many changes, variations and modifications of the specific constructional details may be resorted to without departing from the spirit of the appended claims.

I claim:

1. A trolley bracket comprising a pair of like plates mounted in coinciding relation, a dog pivotally mounted on a transverse axis between said plates, a pair of longitudinally spaced rollers journaled in each of said plates and disposed on the outer side thereof, and means securing said plates together.

2. A trolley bracket comprising a pair of like plates mounted in coinciding relation, a dog pivotally mounted between said plates, a pin mounted transversely in each plate, each pin having a head seated in the inner surface of its plate, said pins being axially aligned and extending beyond the respective outer surfaces of the plates, a roller journaled on the extended portion of each pin, and means securing said plates together.

3. A trolley bracket comprising a pair of like plates mounted in coinciding relation, a dog pivotally mounted between said plates, a roller journaled in each of said plates and disposed on the outer side thereof, a pin seated between said plates and lengthwise thereof, said plates having openings adjacent to said pin, a guide roller mounted on said pin and received in said openings and extending beyond the outer surfaces of said plates and means securing said plates together.

4. A trolley bracket comprising a pair of like plates mounted in coinciding relation, a dog pivotally mounted between said plates, a pin mounted transversely in each plate, each pin having a head seated in the inner surface of its plate, said pins being axially aligned and extending beyond the respective outer surfaces of the plates, a roller journaled on the extended portion of each pin, another pin seated between said plates and lengthwise thereof, said plates having openings adjacent to the last named pin, a guide roller mounted on the last named pin and received in said openings and extending beyond the outer surfaces of said plates, and means securing said plates together.

5. A trolley bracket comprising a pair of like plates mounted in coinciding relation, said plates having aligned recesses in their inner surfaces and near one edge thereof, a dog pivotally mounted in said recesses and extending beyond said edge, said plates also having aligned transverse holes therethrough, each hole being flared at the inner surface of its plate, a pin mounted in each opening and headed in the corresponding flared end, said pins extending beyond the outer surfaces of the plates, a roller mounted on the extended portion of each pin, and means securing said plates together.

6. A trolley bracket comprising a pair of like plates mounted in coinciding relation, said plates having aligned recesses in their inner surfaces and near one edge thereof, a dog pivotally mounted in said recesses and extending beyond said edge, said plates also having aligned transverse holes therethrough, each hole being flared at the inner surface of its plate, a pin mounted in each opening and headed in the corresponding flared end, said pins extending beyond the outer surfaces of the plates, a roller mounted on the extended portion of each pin, said plates having longitudinally extending aligned recesses and aligned openings adjacent to the recesses and intermediate the ends thereof, a roller pin seated in the last named recesses, a guide roller mounted on said pin and received in the last named openings and extending beyond the outer surfaces of said plates, and means securing said plates together.

7. A trolley bracket comprising a pair of like plates mounted in coinciding relation, each plate being formed in its inner surface with a bearing recess and a longitudinal recess, each plate having a transverse hole therethrough spaced from said recesses and an opening therethrough immediately adjacent to the longitudinal recess and between the ends thereof, the corresponding recesses, holes and openings of said plates being aligned with one another transversely of the plates.

8. A plate for a trolley bracket, said plate having an originally flat surface, said plate being formed at said surface with a transverse bearing recess and a longitudinal recess, said plate also having a transverse hole therethrough and an opening therethrough, said opening being disposed immediately adjacent to and between the ends of said longitudinal recess.

9. A plate for a trolley bracket, said plate having an originally flat surface, said plate being formed at said surface with a transverse bearing recess and a longitudinal recess, said plate also having a transverse hole therethrough and an opening therethrough, said hole being flared at said flat surface, said opening being disposed immediately adjacent to and between the ends of said longitudinal recess.

10. A trolley bracket comprising a pair of like plates mounted in coinciding relation, each plate being formed in its inner surface with a longitudinal recess, each plate having a transverse hole therethrough spaced from said recess and an opening therethrough immediately adjacent to said longitudinal recess and between the ends thereof, the corresponding recesses, holes and openings of said plates being aligned with one another transversely of the plates.

ANDREW G. ROSE.

REFERENCES CITED

The following references are of record in the file of this patent:

UNITED STATES PATENTS

| Number | Name | Date |
|---|---|---|
| 1,920,774 | Webb | Aug. 1, 1933 |
| 1,962,531 | Shafer, Jr. | June 12, 1934 |
| 2,116,430 | Gordon | May 3, 1938 |
| 2,249,531 | Landahl | July 15, 1941 |

FOREIGN PATENTS

| Number | Country | Date |
|---|---|---|
| 831,213 | France | May 30, 1938 |